(12) United States Patent
Chauvel et al.

(10) Patent No.: US 7,434,021 B2
(45) Date of Patent: Oct. 7, 2008

(54) MEMORY ALLOCATION IN A MULTI-PROCESSOR SYSTEM

(75) Inventors: Gerard Chauvel, Antibes (FR); Serge Lasserre, Frejus (FR); Dominique D'Inverno, Villeneuve Loubet (FR); Maija Kuusela, Mouans Sartoux (FR); Gilbert Cabillic, Brece (FR); Jean-Philippe Lesot, Argentré du Plessis (FR); Michel Banâtre, La Fresnais (FR); Jean-Paul Routeau, Thorigné-Fouillard (FR); Salam Majoul, Rennes (FR); Frédéric Parain, Voiron (FR)

(73) Assignee: Texas Instruments Incorporated, Dallas, TX (US)

( * ) Notice: Subject to any disclaimer, the term of this patent is extended or adjusted under 35 U.S.C. 154(b) by 508 days.

(21) Appl. No.: 10/831,388

(22) Filed: Apr. 22, 2004

(65) Prior Publication Data

US 2004/0268076 A1 Dec. 30, 2004

(30) Foreign Application Priority Data

Jun. 19, 2003 (EP) .................................. 03291501

(51) Int. Cl.
*G06F 12/00* (2006.01)
*G06F 13/00* (2006.01)
(52) U.S. Cl. .................... 711/170; 711/100; 711/153; 711/154
(58) Field of Classification Search ......... 711/170–172, 711/173, 153, 100, 154
See application file for complete search history.

(56) References Cited

U.S. PATENT DOCUMENTS

| 5,367,637 | A |   | 11/1994 | Wei |
| 5,734,865 | A | * | 3/1998 | Yu .............................. 709/250 |
| 5,784,699 | A | * | 7/1998 | McMahon et al. .......... 711/171 |

(Continued)

FOREIGN PATENT DOCUMENTS

EP 0 844 564 A2 5/1998

OTHER PUBLICATIONS

"Fast Dynamic Process Migration", Eilard T. Roush, et al., Distributed Computing Systems, 1996, Proceedings of the 16th International Conference on Hong Kong, May 27-30, 1996, Los Alamitos, CA, USA, IEEE Comput. Soc, US, May 27, 1996, pp. 637-645, XP010167600, ISBN: 0-8186-7399-0.

(Continued)

*Primary Examiner*—Tuan V. Thai
(74) *Attorney, Agent, or Firm*—Ronald O. Neerings; Wade James Brady, III; Frederick J. Telecky, Jr.

(57) ABSTRACT

A process and associated system comprise pre-allocating a portion of memory in a first processor based upon a control input and determining in a second processor if the portion of the pre-allocated memory can satisfy a memory allocation request. Further, if a portion of pre-allocated memory can satisfy a memory allocation request, the technique includes assigning the pre-allocated portion of memory to the allocation request. However, if a portion of pre-allocated memory cannot satisfy a memory allocation request, the technique includes allocating a portion of memory in the first processor to the allocation request.

16 Claims, 1 Drawing Sheet

U.S. PATENT DOCUMENTS

| | | | |
|---|---|---|---|
| 5,920,732 A * | 7/1999 | Riddle | 710/56 |
| 6,453,404 B1 * | 9/2002 | Bereznyi et al. | 711/171 |
| 6,571,326 B2 * | 5/2003 | Spiegel et al. | 711/170 |
| 2002/0032844 A1 * | 3/2002 | West | 711/171 |
| 2002/0062424 A1 * | 5/2002 | Liao et al. | 711/129 |
| 2003/0084266 A1 * | 5/2003 | Knippel et al. | 711/173 |
| 2003/0177225 A1 * | 9/2003 | Brown et al. | 709/224 |
| 2004/0073763 A1 * | 4/2004 | Dageville et al. | 711/170 |
| 2004/0088336 A1 * | 5/2004 | Pasupathy | 707/205 |

OTHER PUBLICATIONS

"Interprocedural Compatibility Analysis for Static Object Preallocation", Ovidlu Gheorghiolu, et al., ACM Sigplan Notices, Online, vol. 38, Jan. 2003, pp. 273-284, XP002283556, New York, Etats-Unis D'Amerique, ISSN: 0362-1340.

"Java Performance Tuning—Chapter 4 Object Creation", Jack Shirazi, Internet Document, 'Online! Sep. 2000, XP002283555, Retrieved from the Internet: URL:http://www.oreilly.com/catalog/javapt/chapter/ch04.html, retrieved on Jun. 2, 2004.

* cited by examiner

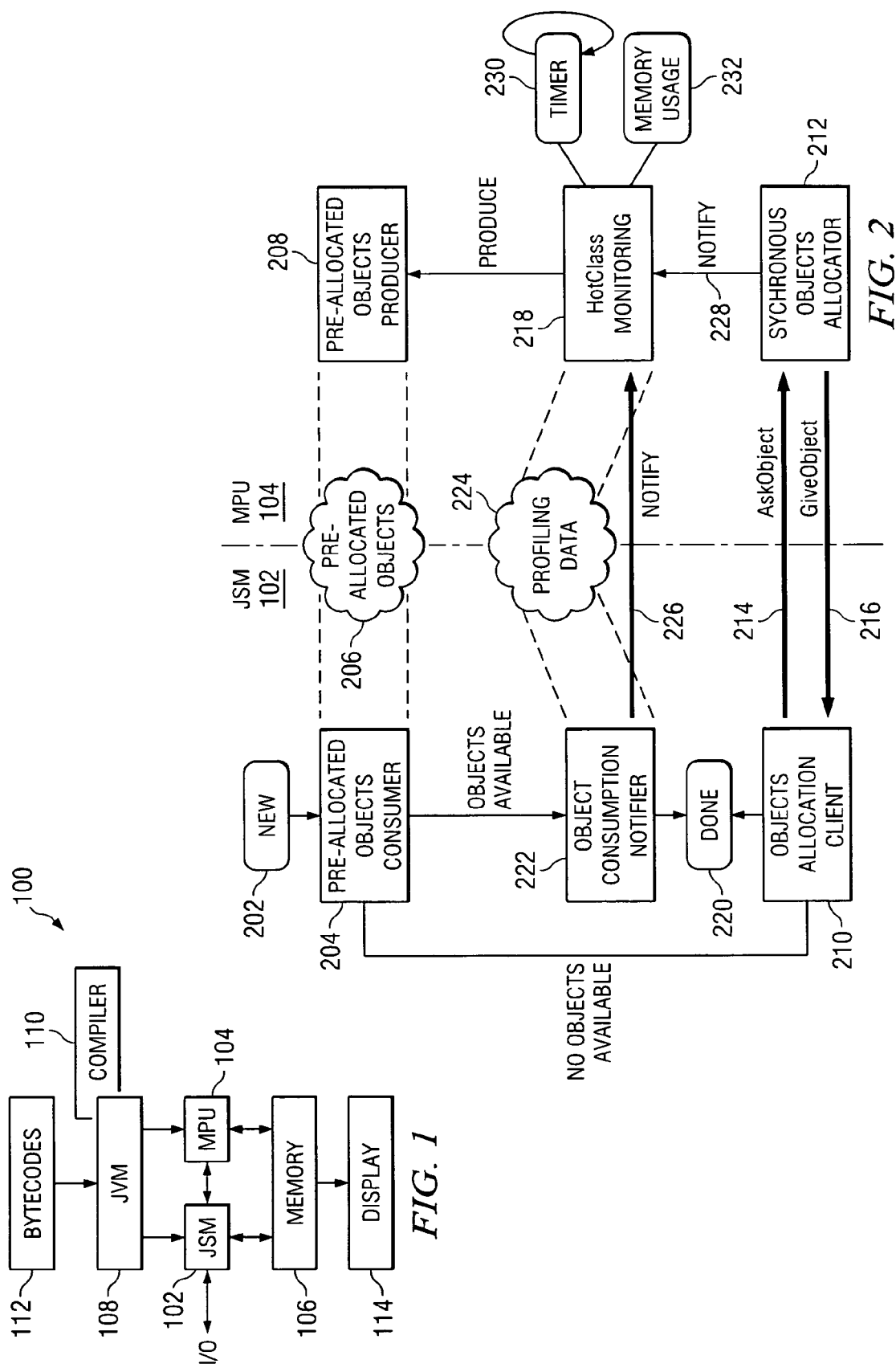

MEMORY ALLOCATION IN A MULTI-PROCESSOR SYSTEM

This application claims priority under 35 USC § (e)(1) of European Application Number 03291501.9, filed on Jun. 19, 2003.

BACKGROUND OF THE INVENTION

1. Technical Field of the Invention

The present invention relates generally to processors and more particularly to management of memory associated with processors.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In some embodiments, a method comprises pre-allocating a portion of memory in a first processor based upon a control input and determining in a second processor if the portion of the pre-allocated memory can satisfy a memory allocation request. Further, if a portion of pre-allocated memory can satisfy a memory allocation request the method includes assigning the pre-allocated portion of memory to the allocation request. However, if a portion of pre-allocated memory cannot satisfy a memory allocation request, the method includes allocating a portion of memory in the first processor to the allocation request.

In other embodiments, a system comprises a first processor, a second processor, memory coupled to the first and second processors and control logic that pre-allocates and initializes a portion of the memory in the first processor. If a pre-allocated portion of memory exists to satisfy a memory allocation request in the second processor, the control logic preferably assigns the pre-allocated portion of memory to the memory allocation request. However, if a pre-allocated portion of memory does not exist to satisfy a memory allocation request, the control logic preferably allocates and initializes a portion of the memory in the first processor for the memory allocation request.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 1 shows a diagram of a system in accordance with preferred embodiments of the invention and including a Java Stack Machine ("JSM") and a Main Processor Unit ("MPU"); and FIG. 2 shows a diagram of an object allocation procedure in accordance with preferred embodiments of the invention.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment The subject matter disclosed herein is directed to a programmable electronic device such as a processor having memory in which programs associated with a stack-based language (e.g., Java) may be stored. The programs may be executed through a "virtual" machine that may be implemented in hardware, software, or a combination of hardware and software. The virtual machine may transform the program into machine code (e.g., Java bytecodes).

In addition to the stack, a portion of memory may be reserved for storing Java objects. This portion of memory contains field values described by a class and meta-data required by the runtime (e.g. Java Virtual Machine). This portion of memory may be referred to as a "heap". When a Java object is created, the object may be allocated memory in the heap and then may be initialized. When a Java object is initialized, field values are initialized to their respective default value and the meta-data is initialized according to the runtime. The size of the memory allocated in the heap may depend upon the class of the Java object created and the size of the associated meta-data. The process of memory allocation followed by the initialization of a Java object is referred to for purposes of this disclosure as "object allocation".

The object allocation process discussed above may be generally applied to any computer program in which a portion of memory is reserved for dynamic allocation. This portion of memory may be referred to as a "heap". When memory is needed for a dynamic allocation, a portion of the heap may be allocated and possibly initialized. The size of the portion allocated in the heap is determined by the application requesting the memory. This process of allocating memory followed by initializing this memory is referred to for purposes of this disclosure as "memory allocation".

The following describes the operation of an object allocation process. The process is easily extended to a memory allocation by replacing "object" with "portion of memory" and "class of an object" with "size associated with the portion of memory".

The following describes the operation of the preferred embodiments of a system in which two processors are utilized. Generally, a first processor is responsible for running applications with an object allocated by a second processor.

The second processor may allocate an object for the first processor though one of at least two mechanisms. A first mechanism asynchronously allocates an object in advance of the request for allocation. This mechanism may be referred to as "pre-allocation". A second mechanism synchronously allocate an object on demand when a request is made from the first processor. This mechanism may be referred to as "synchronous allocation". The request from the first processor to the second processor in accordance with synchronous allocation may create an interrupt in the second processor and therefore produce a delay in the first processor. Thus, pre-allocation may be more efficient than synchronous allocation. However, an object allocated in advance in accordance with the pre-allocation mechanism is associated with a specific class. Only when an object allocation request from the first processor is associated with a specific class from which objects have been pre-allocated, may the request use the pre-allocation mechanism. Requests associated with an object of other classes not pre-allocated may not use the pre-allocation mechanism.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 is referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, a compiler 110 and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired.

Referring still to FIG. 1, as is generally known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, control logic comprising various functional entities exist in JSM 102 and MPU 104 for carrying out pre-allocated and synchronous object allocations. Each such entity preferably takes the form of an executable routine that receives input in the form of a request and carries out a function associated with one of the two object allocation mechanisms. The routine may be implemented in software, hardware, or a combination of both. A discussion of the entities associated with the synchronous object allocation mechanism follows the discussion of entities associated with the pre-allocated object allocation mechanism below.

Referring now to FIG. 2, three entities are associated with the pre-allocated object allocation mechanism. The first entity is responsible for allocating objects. This entity is referred to as the "pre-allocated objects producer" 208 and the objects it allocates are referred to as "pre-allocated objects" 206.

During the pre-allocation mechanism, a request for object allocation associated with a particular class may be received by pre-allocated objects consumer 204. Pre-allocated objects 206 preferably are examined to determine if an object exists of the same class as the class being requested. If an object of the same class does exist in pre-allocated objects 206, this pre-allocated object is assigned to the request.

Pre-allocated objects producer 208 creates pre-allocated objects of specific classes depending on input from a second entity that monitors information about object allocations, referred to as "hotclass monitoring" 218. Hotclass monitoring 218 preferably uses a rule, referred to as a "heuristic", to determine which objects should be created by pre-allocated objects producer 208. The heuristic (e.g., most frequently allocated) determines the specific classes pre-allocated objects producer 208 should instantiate and hotclass monitoring 218 send a corresponding signal ("produce") to pre-allocated objects producer 208. The goal of hotclass monitoring 218 is to determine the classes most likely to be instantiated in the system. The heuristic in hotclass monitoring 218 sends the produce signal to pre-allocated objects producer 208 after using information about past object allocations.

The information about object allocations used by the heuristic is stored in shared memory referred to as "profiling data" 224. Profiling data 224 is stored in memory 106 (FIG. 1). Hotclass monitoring 218 accesses profiling data 224 to retrieve the information about past object allocations and passes the information to the heuristic. The heuristic of hotclass monitoring 218 may help identify specific "likely" classes. The identity of these classes are provided to by pre-allocated objects producer 208 and objects of these classes are pre-allocated accordingly.

In alternate embodiments of the invention, the heuristic may not use shared profiling data 224. Instead, notifications are sent directly from various entities to hotclass monitoring 218. The notifications contain information regarding past object allocations in the system. The heuristic of hotclass monitoring 218 then may use the frequency of such notifications to construct its private profiling data and determine which objects the pre-allocated objects producer 208 should create.

Once objects are created by pre-allocated objects producer 208, a third entity is responsible for assigning objects in pre-allocated objects 206 to requests for object allocations. This entity is referred to as "pre-allocated objects consumer" 204. Pre-allocated objects consumer 204 may receive Java "new" instruction 202. The "new" instruction 202 requests object allocation for a particular class. Pre-allocated objects consumer 204 determines if an object of the same class that the "new" instruction is requesting exists in the pre-allocated objects 206. If a compatible object is found, the object is assigned to the request by pre-allocated consumer 204. The exchange of objects between pre-allocated objects producer 208 and pre-allocated object consumer 204 serves as the basis for the pre-allocation object mechanism.

Still referring again to FIG. 2, since pre-allocated objects 206 preferably take the form of sets of object references in shared memory, coherency may need to be maintained.

Synchronization may exist between entities responsible for pre-allocation of an object. Two types of synchronization exist. The first type is the synchronization between pre-allocated objects producer 208 and pre-allocated objects consumer 204 to effectively manage pre-allocated objects 206. This synchronization may be utilized to prevent two distinct potential behaviors. The first behavior is when pre-allocated object consumer 204 does not see some pre-allocated objects in pre-allocated objects 206. The second behavior is the lost of some pre-allocated object in pre-allocated objects 206. "Strong" synchronization techniques may atomically lock the set of objects in pre-allocated objects 206 so that both pre-allocated objects producer 208 and pre-allocated objects consumer 204 do not produce or consume pre-allocated object simultaneously, thereby avoiding both unwanted behaviors. "Weak" synchronization techniques may not lock the sets atomically in order to increase performance. If there is a garbage collection process the weak synchronization may be used. The potential lost pre-allocated objects described as the second behavior are identified and managed. Either a weak or strong synchronization technique may be used.

Referring again to FIG. 2, the second type of synchronization is, employed in the pre-allocation objects consumer 204 to protect against two consumers attempting to assign the same pre-allocated object to a separate request. For example, two identical "new" instructions may be presented to JSM 102. Pre-allocated objects consumer 204 may assign the first instruction a particular object in pre-allocated objects 206. The second identical "new" instructions should not be assigned the same object. Various types of synchronization techniques may preferably be employed to avoid this unwanted behavior.

In accordance with preferred embodiments of the invention, synchronous object allocation is achieved through two additional entities. Referring again o FIG. 2, a first entity, referred to as "objects allocation client" 210 synchronously requests an object to be allocated. Objects allocation client 210 may preferably be implemented in the JSM 102. A second entity, referred to as "synchronous objects allocator" 212, preferably allocates objects that are requested by objects allocation client 210. Synchronous objects allocator 212 preferably receives object allocation requests from objects allocation client 210 wish an interrupt, if necessary, to the MPU 104 to allocate the requested object.

In accordance with preferred embodiments of the invention, when JSM 102 is presented with a bytecode containing the Java "new" instruction, an object allocation request is sent to the pre-allocated object consumer 204. Pre-allocated objects consumer 204 may examine the pre-allocated objects 206 to determine if an object of the class specified by the "new" instruction already exists in the pre-allocated objects 206. After examining pre-allocated objects 206, two cases may result as discussed below.

The first case occurs when an object of the class specified by the "new" instruction does not exist in the pre-allocated objects 206. In this case, the pre-allocated object mechanism cannot be used. In this first case, the synchronous mechanism of object allocation is employed.

After pre-allocated objects consumer 204 determines that no objects are available in pre-allocated object 206 for the allocation request, per the "no objects available message" from the pre-allocated objects consumer 204, the object allocation client 210 may send an AskObject request 214 for a synchronous object allocation to synchronous objects allocator 212. Synchronous objects allocator 212 preferably responds to the AskObject request with a GiveObject reply 216. The reply 216 preferably includes the reference of object that is synchronously allocated for the request.

When synchronous objects allocator 212 receives the AskObject request 214, profiling data 224 preferably is adjusted to reflect the absence of a suitable object in pre-allocated objects 206. Hotclass monitoring 218 preferably incorporate the adjusted profiling data 224 into the heuristic employed. In an alternate embodiment, synchronous objects allocator 212 may send a notification 228 directly to hotclass monitoring 218 which may incorporate notification 228 into the heuristic.

The second case at pre-allocated consumer 204 occurs when an object of the class specified by the "new" instruction does exist in the pre-allocated objects 206. In this case, the pre-allocated object mechanism is employed. Pre-allocated consumer 204 removes the identified object from pre-allocated objects 206.

After the determination is made by the pre-allocated objects consumer 204 that a suitable object does exist in the pre-allocated objects 206, data in profiling data 224 is preferably adjusted by an entity referred to as "object consumption notifier" 222. The object consumption notifier 222 preferably updates the profiling data 224 to reflect that an object in pre-allocated objects 206 has been consumed. Hotclass monitoring 218 may incorporate adjusted profiling data 224 into the heuristic employed. In an alternate embodiment, an asynchronous notification 226 may be sent directly to hotclass monitoring 218 from object consumption notifier 222 and the hotclass monitoring 218 may incorporate the notification 226 into the heuristic.

Hotclass monitoring 218 may receive information concerning past object allocations preferably from two entities. The first entity, object consumption notifier 222, is responsible for notifying hotclass monitoring 218 that a pre-allocated object of a specific class has been used. Accordingly, the heuristic in hotclass monitoring 218 may inform the pre-allocated objects producer 208 to allocate more objects of the same class to meet demand. The information received from the second entity, the synchronous objects allocator 212, indicates that an object allocation associated with a specific class did not use the pre-allocated object allocation mechanism. The heuristic in hotclass monitoring 218 accordingly may inform pre-allocated objects producer 208 to create objects of the specific class to meet demand. The heuristic in hotclass monitoring 228 incorporates this information to attempt to increase the number of object allocations use the generally more efficient pre-allocated mechanism.

The HotClass Monitoring preferably is executed at predefined intervals according to timer 230. In addition, the HotClass Monitoring may use timer 230 to update profiling data 224 at predefined times. In addition, the heuristic in hotclass monitoring 218 preferably uses memory utilization information from memory usage 232 to more efficiently determine when and which objects pre-allocated objects producer 208 should create.

Numerous variations and modifications will become apparent to those skilled in the art once the above disclosure is fully appreciated. It is intended that the following claims be interpreted to embrace all such variations and modifications

The invention claimed is:

1. A method, comprising:
pre-allocating in a first processor a portion of memory based upon a control input;
determining in a second processor if the portion of the pre-allocated memory can satisfy a memory allocation request; and
wherein if a portion of the pre-allocated memory can satisfy a memory allocation request, assigning the pre-allocated portion of memory to the allocation request and if a portion of pre-allocated memory cannot satisfy a memory allocation request, allocating a portion of memory in the first processor to the allocation request.

2. The method of claim 1 wherein said pre-allocating further comprises initializing the portion of memory pre-allocated.

3. The method of claim 1 wherein said allocating further comprises initializing the portion of memory allocated.

4. The method of claim 1 wherein said control input comprises a set of sizes.

5. The method of claim 4 wherein said pre-allocating portion of the memory in the first processor further comprises executing a heuristic to associate said control input with said set of sizes based upon memory allocation information.

6. The method of claim 5 wherein the execution of the heuristics is carried out at a time indicated by a timer.

7. The method of claim 5 wherein the heuristic uses information about memory usage to associate said control input with said set of sizes.

8. The method of claim 5 wherein said memory allocation information is an asynchronous signal generated from the second processor to the first processor.

9. The method of claim 5 wherein said memory allocation information is stored in memory accessible by the first processor and the second processor.

10. A system, comprising:
a first processor;
a second processor;
memory coupled to the first and second processors; and
control logic that pre-allocates and initializes a portion of said memory in the first processor; and
wherein if a pre-allocated portion of memory exists to satisfy a memory allocation request in the second processor, the control logic assigns the pre-allocated portion of memory to the memory allocation request; and
wherein if a pre-allocated portion of memory does not exist to satisfy a memory allocation request, the control logic allocates and initializes a portion of the memory in the first processor for the memory allocation request.

11. The system of claim 10 wherein the control logic comprises multiple control logic entities that are weakly synchronized.

12. The system of claim 10 wherein the control logic comprises control logic implemented in hardware or software.

13. A system, comprising:
a pre-allocated portion of memory consumer;
a pre-allocated portion of memory producer;
a plurality of pre-allocated portions of memory accessible to the pre-allocated portion of memory consumer and to the pre-allocated portion of memory producer;
a portion of memory allocation client accessible to the pre-allocated portions of memory consumer; and
a synchronous portions of memory allocator coupled to the portions of memory allocation client;
wherein in response to an allocation request, the pre-allocated portions of memory consumer determines whether a pre-allocated portion of memory exists that is responsive to the allocation request and if such a pre-allocated portion of memory exists, assigns said pre-allocated portion of memory to the allocation request, or if a pre-allocated portion of memory does not exist that is responsive to the allocation request, the portions of memory allocation client submits a request to the synchronous portions of memory allocator to cause portion of memory to be allocated and to be assigned to the allocation request.

14. The system of claim 13 wherein the pre-allocated portion of memory producer and pre-allocated portion of memory consumer are weakly synchronized.

15. The system of claim 13 wherein the pre-allocated portion of memory producer is coupled to an entity comprising a heuristic.

16. The system of claim 13 wherein the allocation request is an asynchronous signal.

* * * * *